Figure 1:
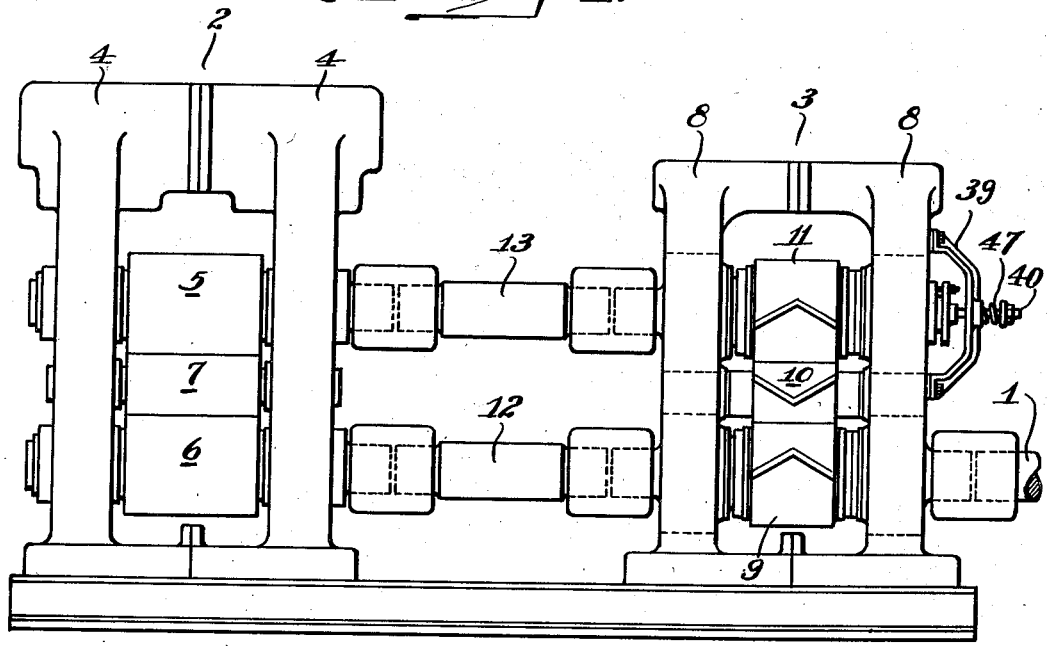

April 2, 1940.  W. R. DUDA  2,195,398
ADJUSTABLE SLIP PINION
Filed Nov. 17, 1938   2 Sheets-Sheet 1

WITNESSES
A.B.Wallace
E.O.Johns

INVENTOR.
Wentzel R. Duda
BY Brown, Critchlow & Flick
his ATTORNEYS.

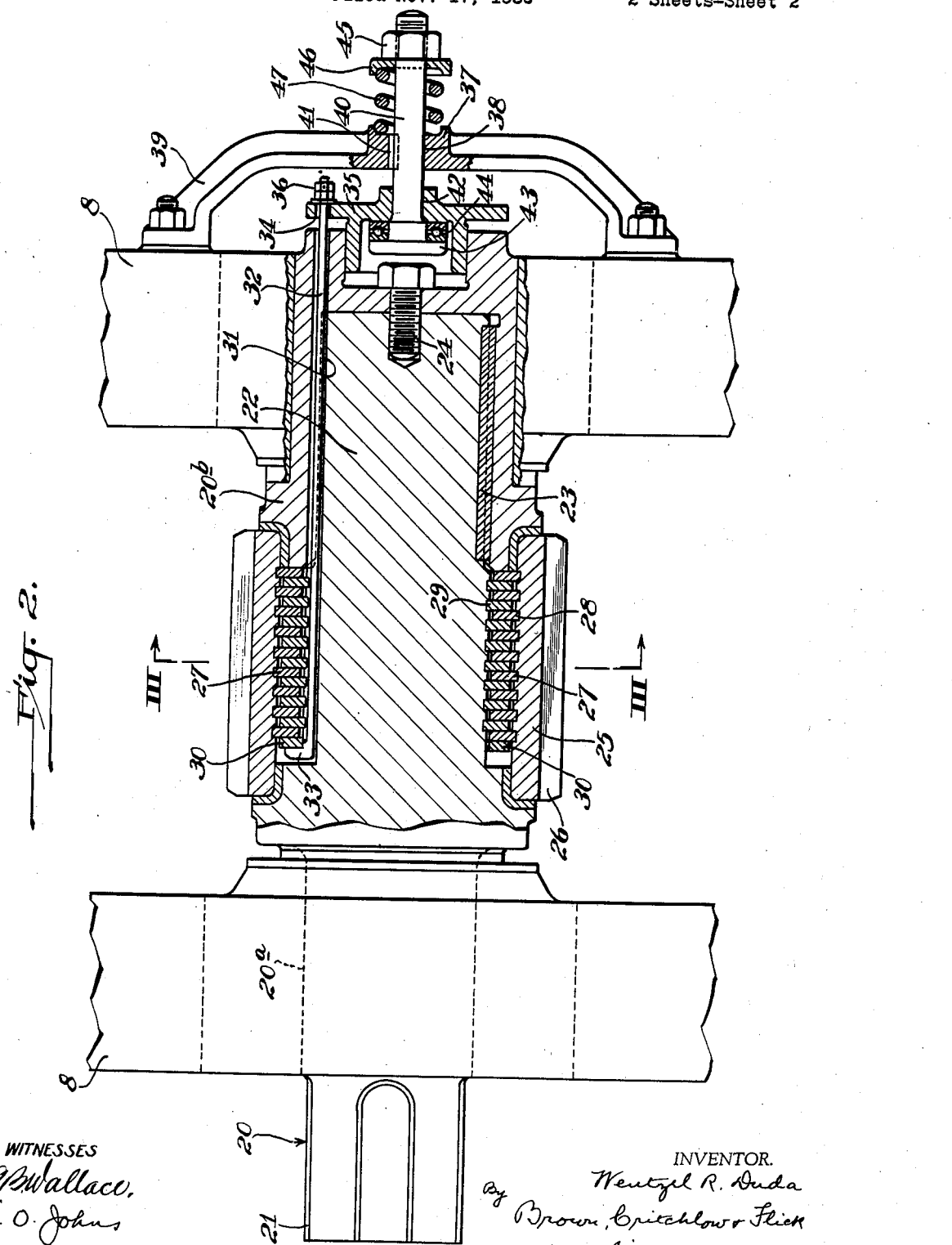

Patented Apr. 2, 1940

2,195,398

UNITED STATES PATENT OFFICE 2,195,398

ADJUSTABLE SLIP PINION

Wentzel R. Duda, Mount Lebanon, Pa.

Application November 17, 1938, Serial No. 240,976

3 Claims. (Cl. 64—30)

My invention is concerned with improvements in power transmitters of the type in which the driving and driven elements are operatively connected by means of a bank of friction plates, such transmitters being used when it is desired to make provision for some relative rotational slippage between the driving and driven elements. Thus it may be desirable to utilize only a fraction of the available power, or to protect the driven element from excessive power peaks, or to insulate the prime mover from harmful overloads, results which are effected by slippage between the friction plates of the power transmitter.

Such transmitters are commonly composed of a rotatable spindle and a rotatable ring journaled upon either the spindle or some other suitable support, the transmission of power through these members being in either direction depending upon the situation in which the machine is employed. A plurality of friction plates, alternatively splined to said spindle and ring to form a bank of interleaved or interposed plates, operatively connect those members and transmit from one to the other a definite part, either the whole or a fraction, of the input power. The amount of power so transmitted depends, of course, upon the frictional adherence of the plates, which in turn is determined by the pressure applied to the plate bank and forcing the plates together.

When a machine is thus used to transmit a certain fraction of the input power rather than for a mere clutching on-and-off action, it is common to provide it with some means by which a steady compressive pressure may be applied to the plate bank so long as the transmission of a particular fraction is desired. The usual practice has, in the past, been to abut one side of the plate bank against a shoulder on either the spindle or ring and to screw against the other side a plurality of bolts lodged in either spindle or ring, the power-transmission fraction thus depending upon the position or tightness of said bolts.

A long appreciated defect in such machinery has been found in the fact that adjustment of these bolts or other similar means used for the same purpose could only be made when the member which carried the bolts was at rest. The inevitable consequence was that, whenever an adjustment was made, the prime mover and all other machinery directly connected to the power-transmitting machine had first to be brought to a complete stop, which consequence followed whether the position of the bolts was erroneous, or a new fraction of input power was desired or a new load condition was encountered. And moreover, the adjustment when made was merely by trial and error, since its effect could not be noted so long as the machinery was at rest.

These objectionable characteristics of prior drive adjustments are especially pronounced in metal rolling mills, to which my invention is particularly applicable. When steel strip is rolled upon a three-high mill stand, detrimental curling of the product often occurs unless the top driven roll is permitted some slight rotational slippage relative to the bottom driven roll. It has long been customary, therefore, to drive the top roll through a power transmitter of the type just described, while the bottom roll is positively connected to the prime mover. Moreover, it has been customary to connect several mill stands to the same prime mover. When strip rolled in one mill began to curl and an adjustment of the power transmitter became necessary, that mill stand and all others directly driven by the same prime mover had to be brought to a full stop in order that a workman might change the positions of several drive-adjusting bolts. Valuable time was thus consumed, and the heating and rolling of bars, strip and the like detrimentally interfered with.

The primary object of my present invention is to provide power-transmitting machines of this type with means by which the compressive force upon the plate bank may be adjusted while the machine is operating and the spindle and ring are rotating.

Other and further objects will appear from the description below.

In the accompanying drawings my invention is illustrated in its applicability to rolling mills, in which drawings Fig. 1 is a somewhat diagrammatic elevation of a three-high sheet mill and drive, the latter being shown partly in section; Fig. 2 a vertical central sectional view of my preferred power transmitter; and Fig. 3 a sectional view taken along the vertical line III—III of Fig. 2.

In Fig. 1 there is generally disclosed a prime mover 1, in the form of a rotatable shaft driven by an engine or motor (not shown), a mill stand 2, and a pinion stand 3 through which power is transmitted from the prime mover to the rolls of the mill. In mill stand 2 there are two end housings 4 in which are journaled a top driven roll 5, a bottom driven roll 6, and a middle idler roll 7; while in pinion stand 3 there are two end housings 8 in which are journaled a bottom pinion 9, a middle pinion 10 meshing with pinion 9, and a top power-transmitter 11 which meshes with pinion 10 and in which is lodged the subject-matter of my invention. Two wobblers 12 and 13, respectively, connect roll 6 and pinion 9 and roll 5 and power transmitter 11. Thus prime mover 1 is directly connected to and drives bottom roll 6 through the shaft of pinion 9 and wobbler 12. On the other hand, prime mover 1 drives top roll 5 only through power transmitter 11, so that some rotational slippage of roll 5 relative to roll 6 may be achieved.

Figure 3:
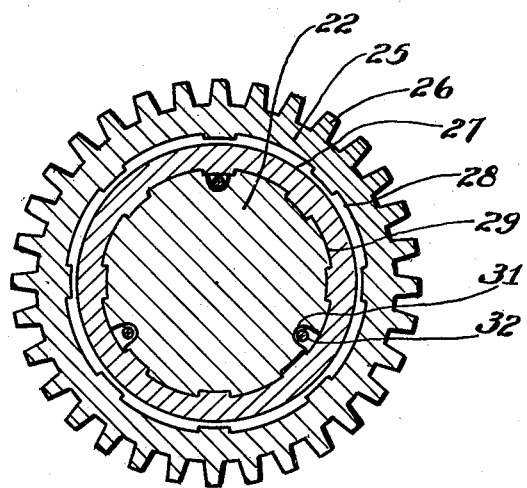

Power transmitter 11 is shown to enlarged scale in Figs. 2 and 3. Journaled in housing 8 of pinion stand 3 is a rotatable spindle 20 formed of two distinct members 20a and 20b. The former is provided upon its outer end with a wobbler section 21 for operative connection with wobbler 13 and is necked down upon its inner end to form a reduced section 22 which fits into a deep socket provided in the inner end of member 20b, the two members being rigidly bound together by a key 23 and a screw 24 or some other mechanical equivalents.

Journaled on the peripheries of members 20a and 20b of spindle 20 is a solid ring 25 which is provided upon its own periphery with gear teeth 26 for engagement with the teeth of middle pinion 11 of Fig. 1. Operative connection between ring 25 and spindle 20 is effected through a plate bank 27, these plates being alternatively splined to the inner wall 28 of ring 25 and to the periphery 29 of pin section 22, provision being made for some movement longitudinally of ring 25 and spindle 20, in order that the frictional adherence of the plates to one another may be varied and the character of the operative connection between ring 25 and spindle 20 consequently changed. One end of plate bank 27 abuts against the inner end of member 20b of spindle 20, while against its other end is placed a movable ring-like collar 30. Plate bank 27 may consist merely of a single plate splined to inner wall 28 and a single one splined to periphery 29 or, as shown in the drawings, a plurality of plates may be splined to either or both inner wall 28 or periphery 29, the exact number, of course, being determined by the desired characteristics of the machine.

Extending longitudinally of pin section 22 there are a plurality of channels 31, three being shown, in each of which is placed a reciprocable rod or force-transmitting member 32. At the inner end of each rod 32 there is an outwardly projecting hook or lug 33 which engages the side of collar 30 in such fashion that when tensional forces are applied to the outer end of rods 32, collar 30 is caused to compress plate bank 27 and increase the frictional adherence of the plates. The outer ends of rods 32 pass through apertures 34 in a circular plate 35 and are securely held in this position by nuts 36 screwed upon those ends. Also, nuts 36 communicate to rods 32 any outward forces applied to plate 35.

A hub 37, through which is an aperture 38, is rigidly attached to housing 8 by means of a spider having legs 39. Passing through aperture 38 and thus supported by hub 37 is a rod 40 which is held against rotation by a key 41 or some mechanical equivalent. The inner end of rod 40 protrudes through an aperture 42 in plate 35 and is provided with a lateral flange 43 of considerably greater magnitude than aperture 42, so that, when tensional forces are applied to the opposite or outer end of rod 40, flange 43 bears against and governs the position of plate 35. Since plate 35 naturally revolves in unison with spindle 20, while rod 40 has no rotational movement, thrust roller bearings 44 are inserted between flange 43 and plate 35 to minimize friction. The outer end of rod 40 is threaded to receive a nut 45 and washer 46 and, surrounding rod 40 between this washer and hub 37, is a strong coil spring 47.

With this apparatus the tensional force created in non-rotating rod 40 by spring 47 is communicated through flange 43 to rotating plate 35 and thence through rods 32 and collar 30 into plate bank 27, where it produces compressive action on, and consequent frictional adherence of the plates. Thus, the pressure of non-rotating spring 47 determines the operative connection between ring 25 and spindle 20, and the fraction of input power supplied to pinion ring 25 which is transmitted to spindle 20 and thence to top roll 5. And thus when different fractions and operative connections are desired, it is necessary only to vary the effective pressure of spring 47, a simple adjustment which can be made by changing the position of nut 45 while the drive is rotating.

This preferred embodiment of my invention fully eliminates the described difficulties and defects of the old apparatus. Adjustment of the pressure on plate bank 27 is effected by turning a single nut rather than numerous ones. Moreover, this simple adjustment is made while the power-transmitting machine is in operation, thus minimizing the required time and expense, eliminating the necessity for closing down other machinery, and enabling the operator to judge the effect of the adjustment at the very moment that it is being made rather than to act upon trial and error.

The advantages of this improvement are apparent in the operation of the rolling mill disclosed in Fig. 1. When the strip being rolled begins to curl, the operator can easily eliminate this defect by immediately adjusting a single nut, it being unnecessary to shut down the prime mover and the numerous mill stands.

The use of this machine in other situations is, of course, contemplated, as are numerous mechanical changes in the apparatus itself. Thus, the direction of power transmission may be from the spindle to the ring and the ways in which spindle 20 and ring 25 are operatively connected to the outside elements, such as wobbler 13 or middle pinion 10, may be varied to suit any situation. And there may be numerous mechanical changes in the apparatus for applying compressive force to plate bank 27.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a rolling mill, an adjustable slip power transmitter comprising a housing, a rotatable spindle journaled therein and adapted to be connected to a mill roll for driving the roll, a driving member encircling the spindle and rotatable relative thereto, a series of friction plates encircling said spindle within said driving member, alternate plates being splined on the spindle, the remaining plates being splined on the driving member, means for moving said plates axially into frictional engagement with one another to transmit power from said driving member to the spindle, said means extending longitudinally of the spindle and projecting from said housing, an axially movable member projecting away from the housing in axial alignment with the spindle, means holding said member against rotation, means rotatably mounted on said non-rotatable member and connected to said plate-moving means, and means for adjusting said non-rotatable member longitudinally while the spindle is rotating to vary the amount of slippage between said plates.

2. In a rolling mill, an adjustable slip power transmitter comprising a housing, a rotatable spindle journaled therein and adapted to be connected to a mill roll for driving the roll, a driving member encircling the spindle and rotatable relative thereto, a series of friction plates encircling said spindle within said driving member, alternate plates being splined on the spindle, the remaining plates being splined on the driving member, a plurality of rods rotatable with and slidable longitudinally of the spindle, the inner ends of said rods engaging the plates to press them into frictional engagement with one another, the outer ends of the rods projecting from said housing, a plate connected to the outer ends of the rods and provided with an opening in axial alignment with the spindle, a headed pin-like member extending through said opening with its head disposed between said plate and spindle, rigid means mounted on the housing holding said pin-like member against rotation with said plate, and means threaded on said member between its outer end and said rigid means for adjusting said member longitudinally while the spindle is rotating to vary the amount of slippage between said plates.

3. In a rolling mill, an adjustable slip power transmitter comprising a housing, a rotatable spindle journaled therein and adapted to be connected to a mill roll for driving the roll, a driving member encircling the spindle and rotatable relative thereto, a series of friction plates encircling said spindle within said driving member, alternate plates being splined on the spindle, the remaining plates being splined on the driving member, said spindle being provided with a plurality of circumferentially spaced passages leading from beneath the innermost plate to the opposite end of the spindle, a rod slidably disposed in each passage with its inner end having a head engaging said innermost plate and with its outer end projecting from said spindle and housing, a plate connected to the outer ends of the rods and provided with an opening in axial alignment with the spindle, a headed pin-like member extending through said opening with its head disposed between said plate and spindle, rigid means mounted on the housing holding said pin-like member against rotation with said plate, and means threaded on said member between its outer end and said rigid means for adjusting said member longitudinally while the spindle is rotating to vary the amount of slippage between said plates.

WENTZEL R. DUDA.